ns by providing rail conversion units located adjacent respective road wheels of the bus.

United States Patent
Cox

[15] 3,701,323
[45] Oct. 31, 1972

[54] CONVERTIBLE RAIL-HIGHWAY VEHICLE

[72] Inventor: Edwin W. Cox, North Kansas City, Mo.

[73] Assignee: W. T. Cox Company, Camdenton, Mo.

[22] Filed: Nov. 16, 1970

[21] Appl. No.: 97,406

[52] U.S. Cl. ............................. 105/215 C, 104/245
[51] Int. Cl. ........ B61d 15/00, B61f 9/00, B62d 61/12
[58] Field of Search ................... 105/215 C; 104/245

[56] References Cited

UNITED STATES PATENTS

| | | |
|---|---|---|
| 1,973,494 | 9/1934 | McCullough et al...105/215 C |
| 3,342,141 | 9/1967 | Browne...................105/215 C |
| 3,228,350 | 1/1966 | Cox..........................105/215 C |
| 3,263,628 | 8/1966 | Grove et al. ...........105/215 C |

Primary Examiner—Gerald M. Forlenza
Assistant Examiner—Howard Beltran
Attorney—Fishburn, Gold & Litman

[57] ABSTRACT

A conventional highway bus is adapted for alternate use on highways and railways by providing rail conversion units located adjacent respective road wheels of the bus. The conversion units raise the front of the bus on rail wheels to a position which deactivates the front road wheels and the rear of the bus is supported by rail wheels only to the extent that it is guided on the rails but propulsion and some braking is obtained through contact between the rails and the rear road wheels. Air bellows suspension is provided on the rail conversion units to simulate road driving characteristics and hydraulic cylinders permit the rail wheels to be withdrawn upwardly out of service during road operation.

7 Claims, 4 Drawing Figures

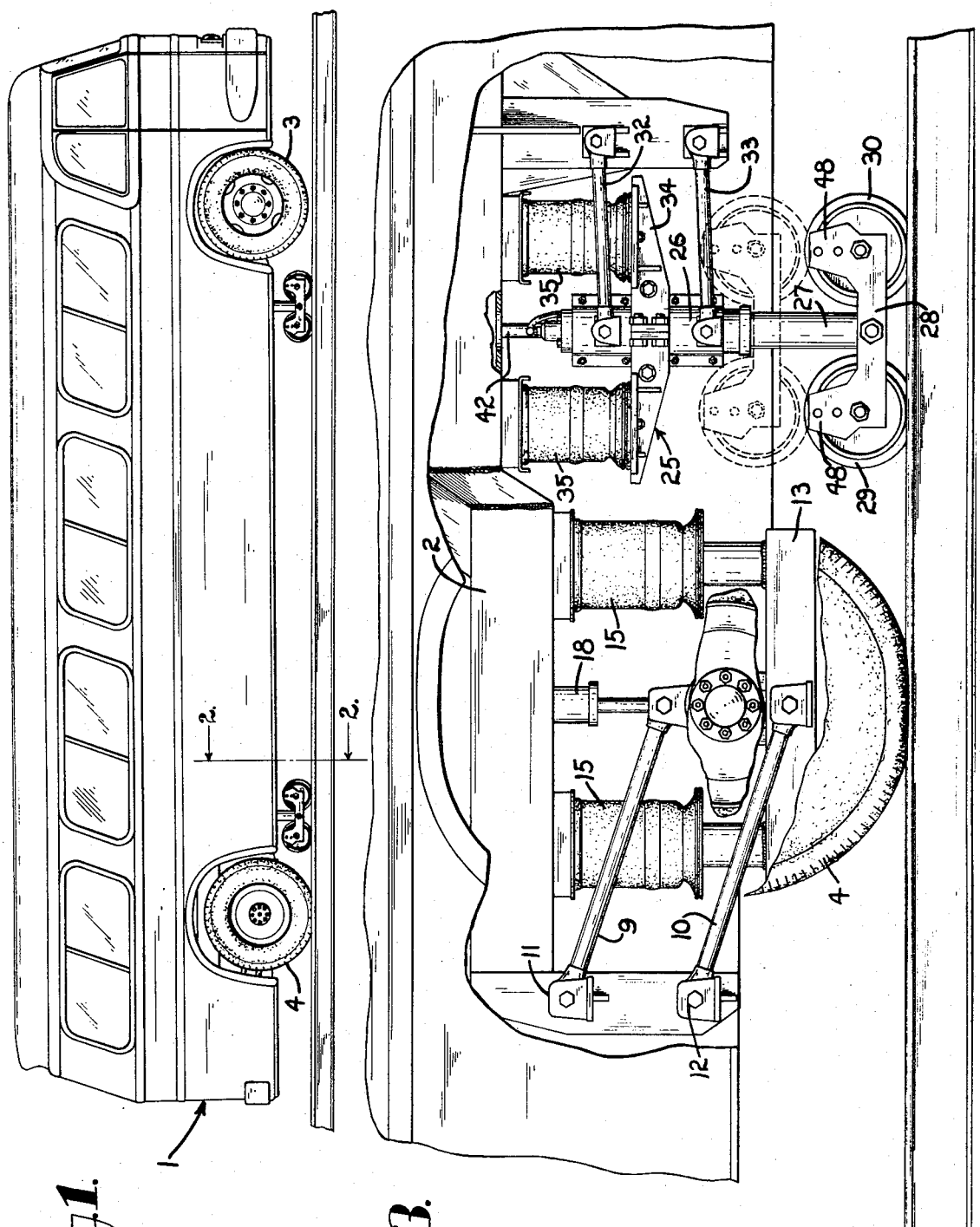

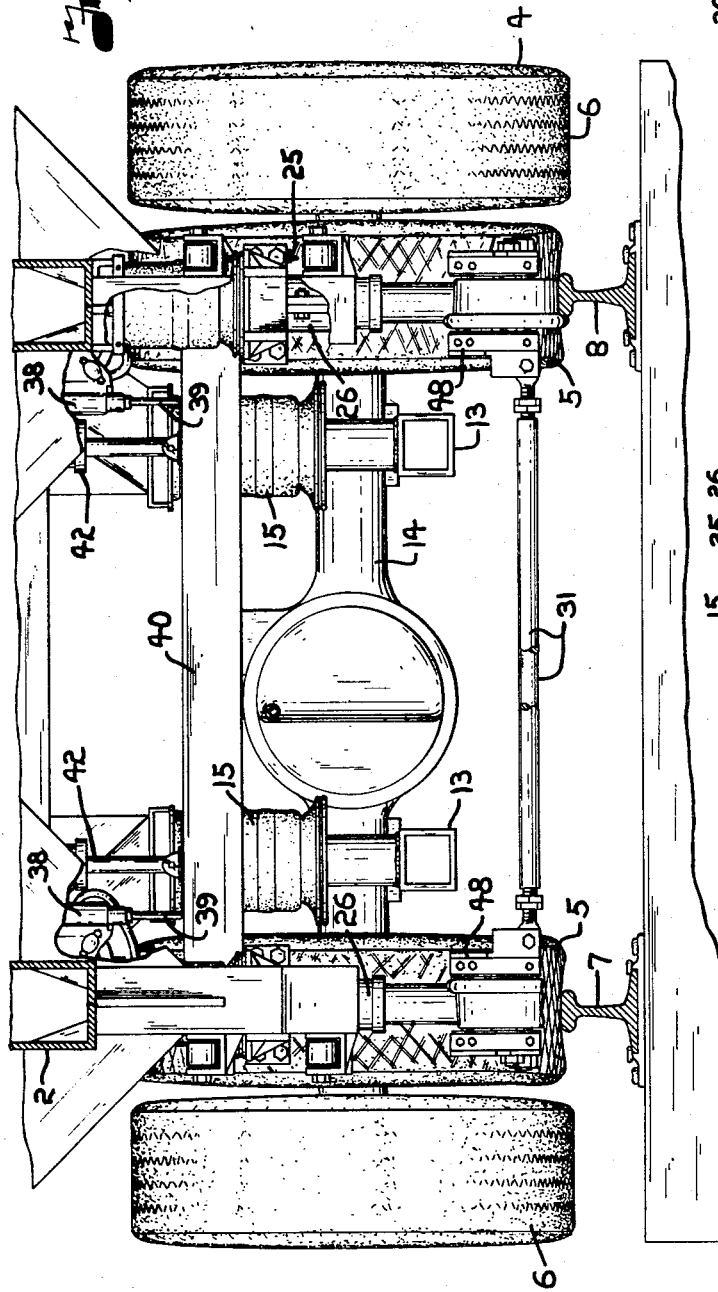

CONVERTIBLE RAIL-HIGHWAY VEHICLE

This invention relates to convertible rail-highway vehicles and more particularly to such vehicles particularly adapted to carry passengers alternately over roads and rails at relatively high speed in comfort.

Vehicles adapted to be used alternately on rails and paved roadways are known. However, such vehicles generally have been used in connection with trucks, construction or railroad maintenance equipment and do not meet the requirements of speed and comfort for commercial passenger service. This invention calls for the use of well known commercial buses, such as those commonly used by public transit companies, which have been converted to alternate use on standard rails with conversion units compatable with, and operated partially through, the standard air suspension system carried by the bus.

It is the principal objects of the present invention to provide a vehicle for alternate use on rails and on roads which is suitable for carrying large numbers of passengers at relatively high speeds and in comfort; to provide such a vehicle that utilizes the conventional power train to the rear wheels for driving and partially braking the vehicle while on rails; to provide such apparatus wherein the rail units are easily withdrawn into an inoperative position when the vehicle is used on roads; and to provide such a vehicle which utilizes a portion of the existing suspension system for the rail mechanism function.

Other objects and advantages of this invention will become apparent from the following description taken in connection with the accompanying drawings wherein are set forth by way of illustration and example certain embodiments of this invention.

FIG. 1 is a side elevational view showing a rail bus embodying this invention operating upon rails.

FIG. 2 is a fragmentary cross-sectional view taken on the line 2—2, FIG. 1, on an enlarged scale, showing apparatus for converting the bus to rail operation.

FIG. 3 is a fragmentary side elevation on the scale of FIG. 2 particularly showing the relationship between the rear bus wheel suspension and the rear rail converting structure.

FIG. 4 is a schematic diagram of the hydraulic and compressed air systems used in connection with the convertible rail bus.

Referring to the drawings in more detail:

The reference numeral 1 generally indicates a passenger carrying vehicle, such as a standard inter-city coach manufactured by General Motors Corporation, having a rear engine and air suspension. In the practice of this invention, the coach or vehicle 1 is convertible to run alternately on standard railroad tracks and on the road.

The vehicle 1 has a frame 2, front road wheels 3 and rear driven wheels 4. The rear wheels 4 are dual, including inner tires 5 and outer tires 6 which, during normal road operation, all contact the ground. The inner tires 5 are spaced apart a distance suitable for simultaneous engagement with respective rails 7 and 8 of standard 56½ inch gauge. Referring particularly to FIG. 3, radius rods 9 and 10, typical of other wheel structure, are pivotally connected at one end thereof to a portion of the frame 2 at 11 and 12. At the other end thereof, the rods 9 and 10 are connected to suspension support 13 which is secured to the rear axle housing 14.

Vertical loads are supported by rubber and nylon fabric air bellows 15 installed between the suspension support 13 and the coach frame 2. In normal use the pressure in the air bellows 15 is varied automatically in proportion to vehicle load by conventional height control valves 16 (FIG. 4), two of which are located at the rear of the bus and one normally at the front. The height control valves 16 each include a valve lever 17 connected by suitable links (not shown) to the axle for altering the pressure in the bellows 15 as vehicle load varies. It is noted that the height control valves 16 are of the known type which do not respond to rapid relative motion between the axles and frame, such as that caused by road bumps. Telescoping type double-acting shock absorbers 18 are mounted at the ends of each axle for reducing the transmission of road shocks to the vehicle body.

The air suspension system of the vehicle 1 includes a pump 19 which maintains air under a predetermined pressure in a suspension air tank 20 through a suitable regulating valve 21 and check valve 22. Suitable air lines 23 conduct air under pressure from the suspension air tank 20 through the height control valve 16 and into distribution lines 24 where the air is introduced into the respective bellows 15.

The rail conversion units are broadly designated 25 and comprise a single vertical leg 26 incorporating an hydraulic cylinder adapted to vertically raise and lower a piston rod or ram 27. A rocker arm 28 is centrally pivoted about the lower end of the ram 27, permitting limited rotation in a vertical plane. Suitable rail wheels 29 and 30 are mounted in tandom on the ends of the rocker arm 28 and thereby have some freedom to ride independently over obstacles or rail vertical discontinuities. The rocker arm 28 is also free to rotate over a limited range with the ram 27 in a horizontal plane whereby cooperating rail wheels are oriented in steer around curves. The applied steering sideload imparted through the rail wheel flanges by the outside rail on a curve is transmitted across to the inside wheels through twin lateral tie rods 31 (FIG. 2) connected to the opposite rocker arms.

Radius rods 32 and 33 are pivotally connected at opposite ends thereof, in the manner described in connection with the radius rods 9 and 10, to support the leg 26 and rail wheels associated therewith, but permit substantial vertical motion with respect to the bus frame 2.

A suspension support 34 is secured to the leg 26 and extends longitudinally forwardly and rearwardly with respect to the vehicle 1 forming platforms for receiving the lower ends of the air bellows 35. The upper ends of the air bellows 35 are fixed with respect to the frame 2, whereby air cushioned support is provided for the rail wheels, as well as the road wheels.

Referring to FIG. 4, air distribution lines 24 of the conventional bus air suspension system is connected through lines 36 to height control valves 37, comparable to the valves 16 noted above. The valves 37 are operated through suitable sensing devices 38 which, in this example, include rods 39 which monitor the relative positions between the frame 2 and the respective leg 26. The rods 39 operate through contact with opposite ends of a rigid cross member 40 which provides rigid structural integration between opposite legs 26. The height control valves 37 feed compressed air, as necessary, into the respective air bellows 35 through suitable air distribution lines 41. The cross member 40 also serves to provide contact points for shock absorbers 42 which act in conjunction with the bellows 35 to impart riding characteristics to the frame 2 similar to that which would be experienced through the conventional road suspension system, even though the vehicle is supported primarily on rails.

The hydraulic cylinders associated with the legs 26 are operated through an hydraulic system consisting of a pump 43, overload bypass valve 44, reservoir 45, distribution lines 46 and individual control valves 47. Controls may be conveniently placed within reach of the bus operator. During road operation, the rail wheels 29 and 30 are withdrawn to the position indicated by the broken lines in FIG. 3. A disc brake 48 is installed on each of the rail wheels and may be operated through the bus air brake system with the regular operator brake pedal (not shown).

The rail conversion units may be installed in a conventional bus with a minimum of alteration in standard equipment. In operation, when it is desired to move the vehicle along rails, alignment is made over the rails and front rail conversion units are actuated to lift the front of the bus some 3 to 4 inches above rail level. The front road suspension system is preferably locked in an elevated condition by suitable hook structure (not shown). The rear rail conversion units are extended downwardly to a point where the bus rear axle load is generally equally shared between the rear rail units and the bus rear wheels, causing substantial contact between the inner tires 5 and the rails 7 and 8, FIG. 2. The contact between the inner tires 5 and the rail is utilized to accelerate the bus through the conventional power train while braking is accomplished through the standard rear brakes of the bus in combination with the braking force available through the disc brakes 48 on the eight rail contacting wheels. The relative loads assumed by the bellows 15 and 35 at the rear of the bus may be easily controlled to maintain the optimum support distribution between rail wheel support and rear tire contact.

It is to be understood that while one form of this invention has been illustrated and described, it is not to be limited thereto except insofar as such limitations are included in the following claims.

What I claim and desire to secure by Letters Patent is:

1. A passenger carrying vehicle for alternate use on rails and on the highway comprising:
   a. a multi-passenger road coach having a frame and front road wheels and rear driven road wheels, said rear road wheels being laterally spaced-apart a distance suitable for engagement with standard rails, an air suspension system between said frame and road wheels and including vertically extensible air bellows for maintaining a constant ride height for road use regardless of load and load distribution in said coach, said air suspension system including a source of compressed air for supplying air under pressure to said air bellows,
   b. front and rear rail conversion units mounted on said frame and respectively located adjacent said front and rear road wheels, said conversion units each including an extensible member adapted for vertical extension beneath said frame, a rail wheel assembly including a rail wheel mounted on the lower end of each of said extensible members,
   c. support means mounted on each of said extensible members, vertically extensible air bellows positioned between said support means and said frame, said last named air bellows being operably connected to said source of compressed air for resiliently supporting a portion of the weight of said vehicle on said rail wheels when said extensible members are extended, and
   d. an air valve assembly operably connected between said source of compressed air and said rear conversion unit air bellows, said air valve assembly including a sensing control member responsive to the relative positions between said frame and said rear conversion unit support means, whereby a predetermined load distribution is maintained between said rear road wheels and said rear conversion unit rail wheels.

2. The vehicle as set forth in claim 1, wherein:
   a. said extensible member includes an hydraulic cylinder, and
   b. said coach includes a source of hydraulic fluid under pressure for operating said hydraulic cylinder.

3. The vehicle as set forth in claim 1, wherein:
   a. said rail wheel assemblies comprise a horizontal rocker arm having opposite ends and centrally pivoted about each of said extensible members for rocking in a vertical plane.
   b. one of said rail wheels being mounted on each of said rocker arm ends.

4. The vehicle as set forth in claim 3, wherein:
   a. said respective rocker arms are located in laterally opposed relation; and
   b. lateral tie rods are connected to said opposed rocker arms.

5. The vehicle as set forth in claim 1 wherein:
   a. said support means comprises a cross beam directed longitudinally of said vehicle and one of said air bellows is positioned at each end of said cross beam.

6. The vehicle as set forth in claim 1, including shock absorbers operably mounted between each of said rail conversion units and said frame.

7. In combination with a road passenger carrying vehicle having air suspension and a frame:
   a. front and rear rail conversion units movably mounted on said frame for alternately supporting said vehicle on rails,
   b. said conversion units each including an extensible member providing selective vertical extension of rail wheels beneath said frame, air bellows between said extensible members and said frame for imparting air suspension to said vehicle when on rails, and
   c. means associated with said rear conversion units and responsive to the relative positions between said frame and said rear conversion unit extensible members for operating said air bellows.

* * * * *